(12) United States Patent
Yeh et al.

(10) Patent No.: US 12,094,641 B2
(45) Date of Patent: Sep. 17, 2024

(54) TWO-SIDED AUXILIARY STRUCTURE FOR INDUCTION CARDS

(71) Applicant: FOURTEEN DESIGN COMPANY LIMITED, Taipei (TW)

(72) Inventors: Ming-Hong Yeh, Taipei (TW); Chung-Ping Lai, Taipei (TW); Wan-Chi Chang, Taipei (TW); Kung-Ting Tsai, Taipei (TW)

(73) Assignee: FOURTEEN DESIGN COMPANY LIMITED, Taipei (TW)

( * ) Notice: Subject to any disclaimer, the term of this patent is extended or adjusted under 35 U.S.C. 154(b) by 607 days.

(21) Appl. No.: 17/403,905

(22) Filed: Aug. 17, 2021

(65) Prior Publication Data

US 2023/0053541 A1    Feb. 23, 2023

(51) Int. Cl.
*H01F 27/28*        (2006.01)
*H01F 27/24*        (2006.01)

(52) U.S. Cl.
CPC ......... *H01F 27/2885* (2013.01); *H01F 27/24* (2013.01)

(58) Field of Classification Search
CPC ...... H01F 27/2885; H01F 27/24; H01F 38/14; H01F 27/361; G06K 7/083; G06K 19/07771; H04B 5/77
See application file for complete search history.

(56) References Cited

PUBLICATIONS

K. Yamada, M. Ishida, S. Yutaka and M. Yamaguchi, "High-performance laminated thin-film shield with conductors and magnetic material multilayer," 2011 IEEE International Symposium on Electromagnetic Compatibility, Long Beach, CA, USA, 2011, pp. 432-437, doi: 10.1109/ISEMC.2011.6038350. (Year: 2011).*

* cited by examiner

*Primary Examiner* — Matthew Mikels

(57) ABSTRACT

The invention provides a two-sided auxiliary structure for induction cards, which comprises: a metal shield layer; and two high-conductivity magnetic layers, which are respectively set on two opposite sides of the metal shield layer, wherein the area of the metal shield layer is greater than those of the two high-conductivity magnetic layers. The two-sided auxiliary structure for induction cards of the invention improves the problem of poor induction success rate of plural induction cards.

12 Claims, 2 Drawing Sheets

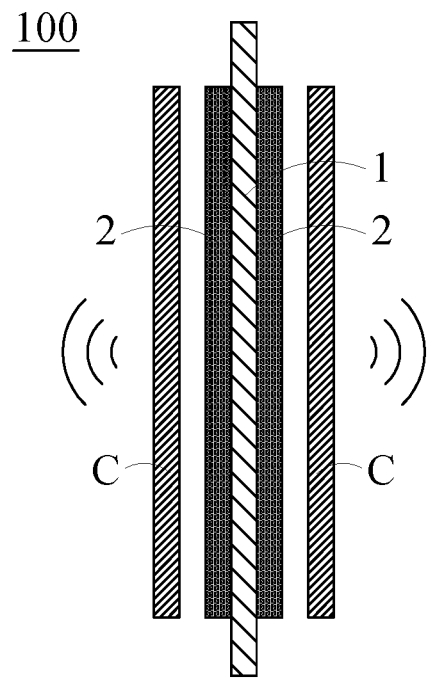
FIG. 1
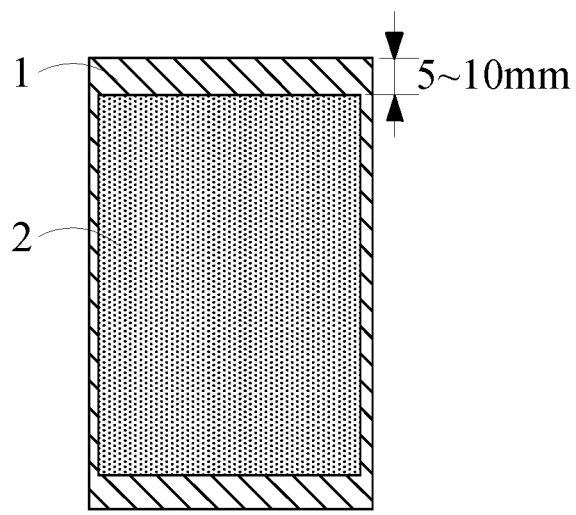 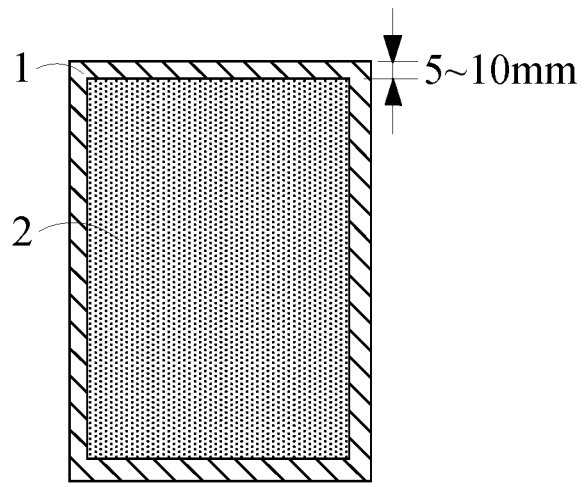
FIG. 2A       FIG. 2B

TWO-SIDED AUXILIARY STRUCTURE FOR INDUCTION CARDS

BACKGROUND OF THE INVENTION

1. Field of the Invention

The present disclosure relates to induction cards, and in particular to a two-sided auxiliary structure for induction cards.

2. Description of the Related Art

At present, the common induction cards on the market, such as access cards, EasyCards, credit cards, etc., carry out signal transmission by low-frequency and high-frequency radio frequency identification (RFID) system or near-field wireless communication (NFC). When two induction cards are close to each other, signal interference problems occur, resulting in failure to induct successfully. It is claimed that card holders can be used for two-sided induction on the market, in two ways: one uses the metal shield layer to block the induction signal of the card on the opposite side, but also make the signal of correct induction side not inducted successfully due to the interference of the metal layer. The other is to add anti-magnetic sheets to the card, but it cannot effectively block the signal interference of the card on the opposite side, resulting in the reader reading multiple identical signals at the same time in a short period of time, leading to induction failure.

BRIEF SUMMARY OF THE INVENTION

Therefore, in order to solve the problems of the induction cards of prior art, the invention provides a two-sided auxiliary structure for induction cards.

To achieve the above objective and other objectives, the invention provides a two-sided auxiliary structure for induction cards, which comprises: a metal shield layer; and two high-conductivity magnetic layers, which are respectively set on two opposite sides of the metal shield layer, wherein the area of the metal shield layer is greater than those of the two high-conductivity magnetic layers.

In an embodiment of the invention, at least one side of the metal shield layer is longer than the two high-conductivity magnetic layers.

In an embodiment of the invention, the area of the metal shield layer is at least 30% larger than those of the two high-conductivity magnetic layers.

In an embodiment of the invention, the area of the metal shield layer is 30% to 70% larger than those of the two high-conductivity magnetic layers.

In an embodiment of the invention, at least one side of the metal shield layer is longer than the corresponding side of the two high-conductivity magnetic layers over 5 mm.

In an embodiment of the invention, at least one side of the metal shield layer is 5 mm to 10 mm longer than the corresponding side of the two high-conductivity magnetic layers.

In an embodiment of the invention, at least one side of the metal shield layer is 8 mm longer than the corresponding side of the two high-conductivity magnetic layers.

In an embodiment of the invention, at least one side of the metal shield layer is longer than the corresponding side of the two high-conductivity magnetic layers over 5%.

In an embodiment of the invention, at least one side of the metal shield layer is 5% to 20% longer than the corresponding side of the two high-conductivity magnetic layers.

In an embodiment of the invention, the two high-conductivity magnetic layers is closely integrated with the metal shield layer.

In an embodiment of the invention, at least one high-conductivity magnetic layer is separated from the metal shield layer at a certain distance.

In an embodiment of the invention, the metal shield layer comprises two metal shield bodies, and the two metal shield bodies are separated from each other at a certain distance and clamped together to form an anti-inductive space.

In an embodiment of the invention, the material of the metal shield layer is selected from at least one of aluminum, steel, iron, gold, silver, copper, nickel, and the thickness of the metal shield layer is 0.01 mm to 3 mm.

In an embodiment of the invention, the two high-conductivity magnetic layers have magnetic conductivity between $10\mu$ and $400\mu$, and the thickness of the two high-conductivity magnetic layers is 0.05 mm to 2 mm.

Therefore, the two-sided auxiliary structure for induction cards of the invention can greatly improve the induction success rate of the induction cards on both sides.

BRIEF DESCRIPTION OF THE DRAWINGS

FIG. 1 is a schematic side view of a two-sided auxiliary structure for induction cards according to the first embodiment of the present disclosure.

FIG. 2A is a front view of the two-sided auxiliary structure for induction cards according to the first embodiment of the present disclosure.

FIG. 2B is a front view of the two-sided auxiliary structure for induction cards according to the second embodiment of the present disclosure.

DETAILED DESCRIPTION OF THE INVENTION

Figure 3A:
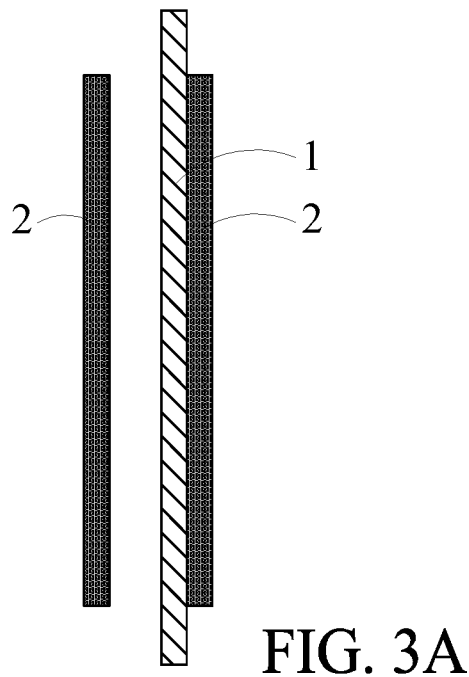
FIG. 3A is a schematic side view of a two-sided auxiliary structure for induction cards according to the third embodiment of the present disclosure.

To facilitate understanding of this present invention, embodiments together with the attached drawings for the detailed description of the present invention are provided. One skilled in the art may understand the object, characteristics and effects of the present invention by the contents disclosed in the specification. It shall be noted that the present invention may also be implemented or applied by other embodiments, and the details in the specification may also be based on different views and applications without departing from the spirit of the present invention for various modifications and variations. The following embodiments will further elaborate on the relevant technical content of the present invention, but the content disclosed is not intended to limit the claims of the present invention. The description is as follows.

As shown in FIG. 1, a two-sided auxiliary structure 100 for induction cards according to a first embodiment of the present invention comprises: a metal shield layer 1 and two high-conductivity magnetic layers 2.

The metal shield layer 1 is a thin metal layer with the property of shielding electromagnetic wave transmission, the material used may be at least one of aluminum, steel, iron, gold, silver, copper, nickel, as well as alloys, mixtures, polymers, natural fibers, synthetic fibers comprising the aforementioned materials, and the present invention is not limited to herein, any metal material with the ability to shield electromagnetic waves can be used as the metal shield layer 1 of the present invention.

The two high-conductivity magnetic layers 2 are respectively set on two opposite sides of the metal shield layer 1. The high-conductivity magnetic layer 2 has excellent magnetic conductivity, which is commonly between 10μ and 400μ. The high-conductivity magnetic layer 2 is an electromagnetic wave absorbing material with broadband absorbing property and absorption of large angle incident waves, such as ferrite. Also, the present invention is not limited to herein, any material with excellent magnetic conductivity can be used as the high-conductivity magnetic layer 2 of the invention. In the present invention, the size of the high-conductivity magnetic layer 2 is approximately equal to the size of the induction card C (e.g., EasyCard, credit card, etc.) circulating on the market, but the present invention is not limited to herein.

As shown in FIGS. 1 and 2A, when the area of the metal shield layer 1 is slightly larger than those of the two high-conductivity magnetic layers 2, the induction success rate of the induction cards on both sides can be greatly improved. Slightly large metal shield layer 1 can effectively block the external electromagnetic field into the opposite side of the metal shield layer 1, but also can block the induction electromagnetic field interference of the induction card C to the opposite side, so effectively as to inhibit the signal interference of the non-correct induction surface. The high-conductivity magnetic layer 2 can change the path of magnetic flux to avoid that the induction electromagnetic field of the induction card C is interfered by the metal shield layer 1, so that the reader can successfully read the induction card C to achieve the effect of two-sided induction. Therefore, by means of the above structure, the two-sided auxiliary structure 100 for induction cards can improve the success rate of two-sided induction.

As shown in FIG. 2A, in the embodiment, at least one side of the metal shield layer 1 is longer than the two high-conductivity magnetic layers 2. Preferably, at least one side is longer than the corresponding side of the two high-conductivity magnetic layers 2 over 5 mm, and further preferably in the range of 5 mm to 10 mm. The metal shield layer 1 is 5 mm longer than the corresponding side of the high-conductivity magnetic layer 2 that has a significant effect of success rate improvement, and the success rate increases with length.

In the embodiment, the high-conductivity magnetic layer 2 corresponds to the size of standard identity card such as current EasyCard, credit card and the like, when the metal shield layer 1 is 8 mm longer than the corresponding side of the high-conductivity magnetic layer 2, the success rate of two-sided induction and the utilization rate of material size can be optimal. However, the present invention is not limited to herein, when the size of the high-conductivity magnetic layer 2 or the two-sided auxiliary structure 100 for induction cards of the present invention changes, the metal shield layer 1 is 8 mm longer than the corresponding side of the high-conductivity magnetic layer 2 that is not necessarily the most suitable value.

As shown in FIG. 2B, in the second embodiment of the present invention, each side of the metal shield layer 1 is 5 mm to 10 mm longer than the corresponding side of the high-conductivity magnetic layer 2. However, the present invention is not limited to herein. In other embodiments, either any one side or plural sides may have a length difference. In other embodiments, at least one side of the metal shield layer 1 is longer than the corresponding side of the two high-conductivity magnetic layers 2 over 5%, and preferably in the range of 5% to 20%, that is, the length relationship between the metal shield layer 1 and the high-conductivity magnetic layer 2 may be the proportion of size, rather than a fixed numerical gap. In other embodiments, the area of the metal shield layer 1 is at least 30% larger than those of the two high-conductivity magnetic layers 2, and preferably 30% to 70% larger.

Figure 3B:
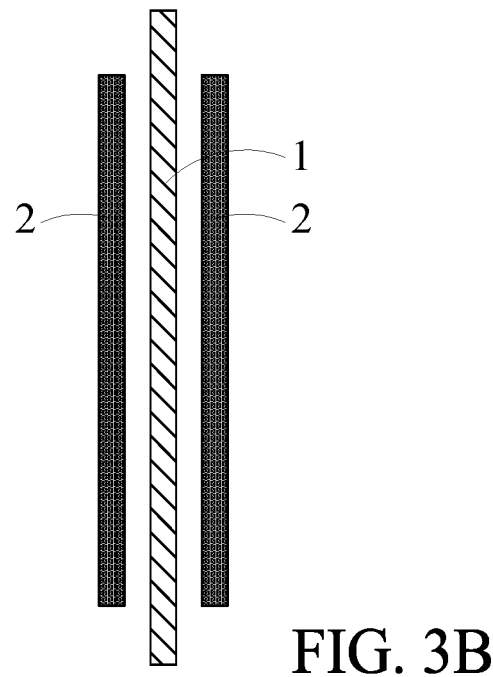
FIG. 3B is a schematic side view of a two-sided auxiliary structure for induction cards according to the fourth embodiment of the present disclosure.

In the first embodiment of the invention, the two high-conductivity magnetic layers 2 is closely integrated with the metal shield layer 1. However, the present invention is not limited to herein, as shown in FIG. 3A, in the third embodiment of the present invention, at least one high-conductivity magnetic layer 2 is separated from the metal shield layer 1 at a certain distance; and as shown in FIG. 3B, in the fourth embodiment of the present invention, the two high-conductivity magnetic layers 2 are separated from the metal shield layer 1 at a certain distance. A leather layer, paper layer, other material, or air may be sandwiched between the high-conductivity magnetic layer 2 and the metal shield layer 1, that is, the two-sided auxiliary structure of induction cards of the present invention shall not be limited to that the high-conductivity magnetic layer 2 must be adjacent to the metal shield layer 1.

Figure 4:
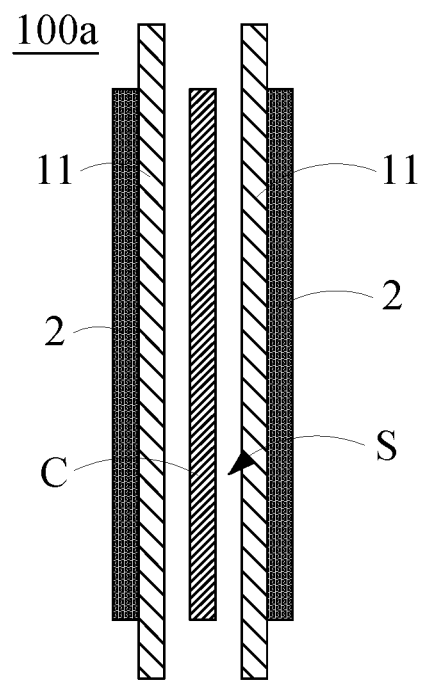
FIG. 4 is a schematic side view of a two-sided auxiliary structure for induction cards according to the fifth embodiment of the present disclosure.

Further, in the fifth embodiment of the present invention, as shown in FIG. 4, the metal shield layer 1 of the two-sided auxiliary structure 100a for induction cards actually comprises two metal shield bodies 11, and the two metal shield bodies 11 are separated from each other at a certain distance and clamped together to form an anti-inductive space S. Both sides of the anti-inductive space S are the metal shield bodies 11, so electromagnetic waves cannot pass through the metal shield body 11 into the anti-inductive space S, and thus the anti-inductive space S can be used to place any card that is not desired to be read. In other words, in addition to both sides of the two-sided auxiliary structure 100a for induction cards in the embodiment where the commonly used induction cards can be placed, the anti-inductive space S formed in the inside where induction cards in need of higher security can also be placed, to prevent the card from being read without authorization, and thus has anti-theft function.

Further, the two-sided auxiliary structure for induction cards of the invention may be used alone, or in combination with other structures that the two-sided auxiliary structure is set in a card sleeve, wallet or purse. In order to facilitate the use and easy to carry, the thickness of the metal shield layer 1 is preferably 0.01 mm to 3 mm, and the thickness of the two high-conductivity magnetic layers 2 is 0.05 mm to 2 mm.

While the present disclosure has been described by means of specific embodiments, numerous modifications and variations could be made thereto by those skilled in the art without departing from the scope and spirit of the present disclosure set forth in the claims. Therefore, the scope of the invention is indicated by the appended claims.

What is claimed is:

1. A two-sided auxiliary structure for induction cards, comprising:

a metal shield layer; and two high-conductivity magnetic layers, respectively set on two opposite sides of the metal shield layer, wherein the area of the metal shield layer is greater than those of the two high-conductivity magnetic layers, and at least one side of the metal shield layer is longer than the two high-conductivity magnetic layers.

2. The two-sided auxiliary structure for induction cards according to claim 1, wherein the area of the metal shield layer is at least 30% larger than those of the two high-conductivity magnetic layers.

3. The two-sided auxiliary structure for induction cards according to claim 2, wherein the area of the metal shield layer is 30% to 70% larger than those of the two high-conductivity magnetic layers.

4. The two-sided auxiliary structure for induction cards according to claim 1, wherein at least one side of the metal shield layer is longer than the corresponding side of the two high-conductivity magnetic layers over 5 mm.

5. The two-sided auxiliary structure for induction cards according to claim 4, wherein at least one side of the metal shield layer is 5 mm to 10 mm longer than the corresponding side of the two high-conductivity magnetic layers.

6. The two-sided auxiliary structure for induction cards according to claim 1, wherein at least one side of the metal shield layer is longer than the corresponding side of the two high-conductivity magnetic layers over 5%.

7. The two-sided auxiliary structure for induction cards according to claim 6, wherein at least one side of the metal shield layer is 5% to 20% longer than the corresponding side of the two high-conductivity magnetic layers.

8. The two-sided auxiliary structure for induction cards according to claim 1, wherein the two high-conductivity magnetic layers is closely integrated with the metal shield layer.

9. The two-sided auxiliary structure for induction cards according to claim 1, wherein at least one high-conductivity magnetic layer is separated from the metal shield layer at a certain distance.

10. The two-sided auxiliary structure for induction cards according to claim 1, wherein the metal shield layer comprises two metal shield bodies, and the two metal shield bodies are separated from each other at a certain distance and clamped together to form an anti-inductive space.

11. The two-sided auxiliary structure for induction cards according to claim 1, wherein the material of the metal shield layer is selected from at least one of aluminum, steel, iron, gold, silver, copper, nickel, and the thickness of the metal shield layer is 0.01 mm to 3 mm.

12. The two-sided auxiliary structure for induction cards according to claim 1, wherein the two high-conductivity magnetic layers have magnetic conductivity between 10μ and 400μ, and the thickness of the two high-conductivity magnetic layers is 0.05 mm to 2 mm.

* * * * *